Patented Mar. 11, 1947

2,417,346

UNITED STATES PATENT OFFICE 2,417,346

DEGRADATION TREATMENT OF LIGNIN MATERIAL

Friedrich Emil Brauns and Irwin A. Pearl, Appleton, Wis., assignors, by mesne assignments, to Sulphite Products Corporation, Appleton, Wis., a corporation of Wisconsin No Drawing. Application October 23, 1943, Serial No. 507,458

9 Claims. (Cl. 260—124)

The present invention relates to the treatment of lignin substances and is directed in particular to an improved degradation process of lignosulfonate material such as calcium lignosulfonate, and the like.

It has been known for some time that lignin—considered for the most part to be a waste product of the paper industry, was a source of materials of value in the art. Various degradation treatments of the complex lignin molecule have been suggested heretofore, but have proven unsatisfactory, due, for example, to low yields of chemicals of the type particularly desired. Illustrative examples of prior suggestions are the Suida and Prey Ber. 74B:1916 (1941) experiments with water and methyl and ethyl alcohols and "Scholler" lignin i. e. a highly polymerized acid lignin obtained as a by-product from the Scholler-Tornesch wood saccharification process in which wood is treated with sulfuric acid under pressure. The results obtained by these investigators, including high yields of neutral oils and low yields of desired chemicals shows these acid lignin processes to be far from satisfactory.

We discovered after a prolonged research investigation an improved process free from the disadvantages found to be present in the processes suggested heretofore. Our process, for example, has been found to give low yields of unwanted materials and exceptionally high yields of phenolics and other desired chemicals.

The process of the present invention employs a lignosulfonate material as, for example, an alkaline earth metal (calcium) lignosulfonate, and preferably a corbohydrate-free material such as obtained by the process of U. S. Patent No. 1,- 856,558 or Reissue Patent No. 18,268. Compositions containing lignosulfonate or the equivalent, such as sulfite waste liquor solids, however, may be employed, if desired. The degradation of the lignin material is carried out under pressure at a temperature around 300° C. in the presence of an alkaline hydroxide, such as calcium, or like alkaline earth metal hydroxide, and an aqueous reaction medium containing an alcohol of the type specified hereinafter.

The ratio of lignin material such as calcium lignosulfonate, to alkaline hydroxide such as calcium hydroxide, is preferably about 2:1. Larger or smaller proportions of hydroxide may be employed, although in any case sufficient alkaline material should be present to react with liberated acid materials and keep the reaction mixture alkaline.

The alcohols suitable for use in our process may be any aliphatic (or inert substituted aliphatic) alcohol which will not substantially raise the pressure of water at a temperature of approximately 300° C. Illustrative examples are butanol, benzyl alcohol, cyclohexanol, isobutanol, the pentanols, etc. Due to ease of recovery, the preferred alcohols for use in the present invention are the water immiscible alcohols.

It is interesting to note that while our investigations show the presence of an alcohol essential, the lower alcohols such as methyl and ethyl alcohols are not adaptable for use in the process of the present invention. Alcohols of this type when heated under pressure i. e. in a closed container, to around 300° C., develop extremely high pressures. While the details of the reactions taking place during degradation are not fully understood at the present time, extensive investigations have demonstrated that high yields of the desired chemicals may readily be obtained by employing lignosulfonate material and the type of alcohol specified above.

The reaction medium is preferably made up of a mixture of water and alcohol in a ratio of about 1:1 by volume, and the combined water-alcohol medium should ordinarily range from around 7-8 parts by weight to 1 part of lignosulfonate material. These proportions may be varied somewhat, the optimum proportions for treating a particular type of material using various reactants being readily ascertainable by preliminary experiment. The time of treatment also varies with the temperature employed—a treatment for around one hour at approximately 300° C. being preferred. Longer periods of treatment at around 272° C. and shorter periods of treatment at around 328° C. may be employed, if desired. The temperature employed should be sufficient to cause desired degradation, but not too high (e. g. above 330° C.) to cause unwanted degradation. The optimum results are obtained as indicated when a temperature of around 300° C. is employed.

The following examples will serve to illustrate the present invention.

Example 1

About 30 parts of calcium lignosulfonate and 15 parts of calcium hydroxide are first mixed with a mixture made up of about 120 parts of water and 97 parts of butanol. The mixture is then placed in a suitable closed container and heated under pressure for about one hour at about 300° C.

The reaction mixture which is allowed to cool, may be worked up by various treatments, the following being illustrative. The reaction mixture is acidified with hydrochloric acid, and the large amount of sulfur dioxide evolved collected in any suitable manner, for example, in alkali. The acidified tarry mixture is washed with fresh aqueous butanol-1:1 (water to butanol) by volume, in which it substantially completely dissolves. The water and butanol layers are then separated, the water fraction being extracted with ether, and the extract distilled to obtain a butanol containing oil. This oil is added to the original butanol layer which is then distilled under reduced pressure, substantially all of the butanol being recovered by azeotropic distillation with water. The resulting black tar is extracted with ether in which most of it dissolves. The insoluble residue is an alcohol-soluble degraded lignin material. The ether extract obtained above is first extracted with about a 20% aqueous $NaHSO_3$ solution. This removes the aldehydic fraction which may be recovered by acidification ($H_2SO_4$) and ether extraction of the acidified extract. The ether solution remaining after the aldehyde extraction is next extracted with about a 8% aqueous $NaHCO_3$ solution. This removes the acidic fraction which may be recovered by acidification of the $NaHCO_3$ aqueous extract. The ether solution remaining after the removal of the aldehyde and acid fractions is then extracted with about a 5% aqueous NaOH solution. This removes the phenolic fraction from the neutral products (chiefly esters) remaining in the ether extract. The phenols may be recovered by acidification of the aqueous NaOH extract.

*Example 2*

About 300 parts of sulfite waste liquor solids (i. e. solids obtained from the spent liquor of the well-known sulfite pulping process), and 300 parts of powdered calcium hydroxide are first mixed with a 1:1 (by volume) water-butanol mixture containing about 1200 parts of water. The resulting mixture is then heated in a closed container (under pressure) for about one hour at about 297°–303° C. The reaction mixture is then allowed to cool and is ready to be worked up as, for example, in accordance with the procedures outlined in Example 1. The use of larger amounts of alkaline hydroxide in the process of Example 2, is due to the relatively high acidity of the sulfite waste liquor solids compared to the calcium lignosulfonate employed in the process of Example 1.

The process of the present invention in addition to giving exceptionally high yields of desired products, also makes it possible to recover large amounts of sulfur dioxide. This feature and the ease of alcohol recovery when water immiscible alcohols are employed, have been found to be of great commercial importance in large scale operations.

The products obtained by the degradation process of the present invention have been found to have utility in various arts. Some of the products, for example, are adaptable for use in the plastic and resin fields, while other products or compositions have been found to be particularly good sources of various types of aromatic chemicals. The products obtained by the process of the present invention may also be readily modified by hydrogenation, controlled destructive distillation, etc.

It will be understood that the present invention is not limited to the above illustrative examples. All modifications coming wtihin the scope of the present invention are intended to be covered by the following claims.

We claim:

1. The improved degradation process which comprises reacting sulfonated lignin material with calcium hydroxide under autogenic pressure in an alkaline water-butanol reaction medium at a reaction temperature of approximately 300° C.

2. The process which comprises reacting under autogenic pressure a mixture made up of about 2 parts calcium lignosulfonate and 1 part of calcium hydroxide in the presence of a water-butanol reaction medium at a reaction temperature of approximately 300° C.

3. The process which comprises reacting under autogenic pressure a mixture made up of about 1 part of sulfite waste liquor solids and 1 part of calcium hydroxide in the presence of a water-butanol reaction medium at a reaction temperature of approximately 300° C.

4. The process which comprises reacting under autogenic pressure a mixture made up of about 30 parts of calcium lignosulfonate, 15 parts calcium hydroxide, 120 parts of water and about 97 parts of butanol for about one hour at a reaction temperature of approximately 300° C.

5. The process which comprises reacting under autogenic pressure a mixture made up of about 30 parts of sulfite waste liquor solids, 30 parts calcium hydroxide, 120 parts of water, and about 97 parts of butanol for about one hour at a reaction temperature of approximately 300° C.

6. The process for transforming calcium lignosulfonate into degradation products substantially entirely soluble in butanol or water, which comprises heating the same to about 300° under autogenic pressure; in the presence of about seven times its weight of a mixture of butanol and water and half its weight of calcium hydroxide; acidifying the mixture to recover sulfur dioxide; and thereafter dissolving the tarry material present in additional water and butanol.

7. The process for transforming calcium lignosulfonate into degradation products substantially entirely soluble in butanol or water, which comprises heating the same to about 300° under autogenic pressure; in the presence of a mixture of about four times its weight of butanol and four times its weight of water and half its weight of calcium hydroxide; acidifying the mixture; and thereafter dissolving the tarry material present in additional water and butanol.

8. The process which comprises reacting sulfonated lignin material with an alkaline earth metal hydroxide in an aqueous alcoholic reaction medium under autogenic pressure at a reaction temperature of about 272°–328° C., the said medium containing a significant proportion of an aliphatic alcohol selected from the class of aliphatic alcohols which do not substantially raise the pressure of water at approximately 300° C.

9. The process which comprises reacting sulfonated lignin material with an alkaline earth metal hydroxide in an aqueous alcoholic reaction medium under autogenic pressure at a reaction temperature of about 272°–328° C., the said medium containing a significant proportion of an aliphatic alcohol selected from the class of aliphatic alcohols which do not substantially raise the pressure of water at approximately 300° C. and which are water immiscible.

FRITZ E. BRAUNS.
IRWIN A. PEARL.

REFERENCES CITED

The following references are of record in the file of this patent:

UNITED STATES PATENTS

| Number | Name | Date |
|---|---|---|
| 2,069,185 | Hibbert et al. | Jan. 26, 1937 |
| 2,057,117 | Sandborn et al. | Oct. 13, 1936 |

FOREIGN PATENTS

| Number | Country | Date |
|---|---|---|
| 546,941 | German | Mar. 17, 1932 |